United States Patent [19]

Kane

[11] 4,097,433

[45] Jun. 27, 1978

[54] HEAT-SEALABLE VINYLIDENE CHLORIDE COPOLYMER COATING COMPOSITION

[75] Inventor: William Paul Kane, Bon Air, Va.

[73] Assignee: E. I. Du Pont de Nemours and Company, Wilmington, Del.

[21] Appl. No.: 688,477

[22] Filed: May 20, 1976

[51] Int. Cl.² ............................................. C08L 91/00
[52] U.S. Cl. ...................... 260/23 AR; 260/23 XA; 260/28.5 AV; 260/28.5 D; 427/385 R; 427/365; 427/407 D; 428/510
[58] Field of Search ....... 260/23 XA, 28.5 D, 23 AR, 260/28.5 AV; 100/244; 427/209, 379, 385, 390, 385 R, 365, 407 D; 428/520, 510

[56] References Cited

U.S. PATENT DOCUMENTS

| | | | |
|---|---|---|---|
| 2,525,671 | 10/1950 | Hauser | 260/28.5 |
| 2,990,391 | 6/1961 | Grantham | 260/30.4 |
| 3,375,215 | 3/1968 | Kane | 260/23 XA |
| 3,511,793 | 5/1970 | Ezell | 260/23 XA |
| 3,677,811 | 7/1972 | Kail | 117/138.8 E |
| 3,817,780 | 6/1974 | Hinkamp | 117/145 |
| 3,879,359 | 4/1975 | Hinkamp | 526/329.3 |
| 3,959,526 | 5/1976 | Swerlick | 427/209 |

FOREIGN PATENT DOCUMENTS 1,333,566  10/1973  United Kingdom.

OTHER PUBLICATIONS

ASTM Standards, Plastics–Method of Testing, part 27, June 1965, pp. 745–752, ASTM E96–63T.

*Primary Examiner*—Melvyn I. Marquis

[57] ABSTRACT

A heat-sealable coating composition which comprises a copolymer of vinylidene chloride and one or more other ethylenically unsaturated monomers, there being one such copolymer containing at least about 5 weight percent methacrylonitrile, the total vinylidene chloride content of the polymer(s) in the composition being at least about 88 weight percent of the polymer(s), and specified amounts of behenic acid, carnauba wax, candelilla wax, stearamide and glyceryl monostearate; base films coated therewith, and coating baths thereof. The coated film is a versatile packaging film, which not only can be used without difficulty on various types of automatic packaging machines, but also can be used for making various laminated films and as a substrate for extrusion coated films.

9 Claims, No Drawings

HEAT-SEALABLE VINYLIDENE CHLORIDE COPOLYMER COATING COMPOSITION

BACKGROUND OF THE INVENTION

The invention concerns improvements in and relating to heat-sealable coating compositions of vinylidene chloride copolymers used as coatings on organic polymeric films.

Coating compositions of the above-specified type are applied to various base films so as to achieve combinations of properties not possessed by either the base film or coating alone. Packaging films must possess properties such as, but not limited to, low permeability to water vapor, good optical properties, and resistance to blocking. Packaging films which possess the aforesaid properties have been designed and formulated for individual purposes such as good runnability on specific types of automatic packaging machinery, or lamination to other films, foils or paper. To aid in achieving the particular combination of properties required for a specific use, various additives have been incorporated in minor amount into the coating compositions.

For example, U.S. Pat. No. 2,525,671 discloses the use in vinylidene chloride copolymer coatings of natural and synthetic ester waxes such as carnauba and candelilla waxes to improve the slip characteristics. These and other waxes are used in similar coatings for similar purposes in U.S. Pat. No. 2,711,996, more particularly, to prevent hot stick in packaging machines which heat-seal the film.

U.S. Pat. No. 3,375,215 describes vinylidene chloride copolymer coatings which contain, among other additives, candelilla wax and stearamide, for the purpose of achieving good release from the crimped heat-sealing jaws used in some automatic packaging machines.

Such films, however, are not entirely suitable for other purposes, such as thermal lamination to various other films or as a substrate for extrusion coating with a molten polyolefin, because inadequate bond strength, due to the presence of the waxy materials, permits delamination of the resulting composite film. For such other uses, different coating formulations are required. The coating formulations used for laminating film generally contained lesser amounts of the indicated minor constituents, or different minor constituents. Although suitable for lamination and extrusion coating, such films were not suitable for use in high speed packaging machines because of sticking of the film to sealing jaws and other hot surfaces, or inadequate heat-seal strength when run at high speeds. Aftersizing one or both sides of such film with a release agent permitted in some cases the successful use of such film in some automatic packaging machines, but aftersizing is undesirable because of the added costs of the additional manufacturing step and the resulting increase in the number of film types which must be made and held in inventory. Past attempts to formulate a coating composition suitable for both automatic packing machines and for lamination have failed, and this is not surprising because most film properties are sensitive to the type and amount of minor constituents added and vary unpredictably in this respect.

SUMMARY OF THE INVENTION

According to the present invention there is provided a heat-sealable coating composition comprising at least one copolymer of vinylidene chloride and at least one other ethylenically unsaturated monomer copolymerizable therewith, there being one copolymer containing at least about 5 weight percent methacrylonitrile, the total vinylidene chloride content on a weighted average basis being at least about 88 weight percent of the total copolymer, and, per 100 parts by weight of the total copolymer, 2.7 to 3.3 parts by weight of behenic acid, 0.4 to 0.6 part by weight of carnauba wax, 1.2 to 1.8 parts by weight of candelilla wax, 0.5 to 1.0 part by weight of stearamide, and 2.7 to 3.3 parts by weight of glyceryl monostearate.

According to other aspects of the present invention, there are also provided coated films carrying the above-specified coating composition, and coating baths of the coating composition in a volatile organic solvent.

The improved coating composition of the invention provides coated films which not only are suitable for use in automatic packaging machinery, but also are suitable for lamination to other films and as a substrate for extrusion coating. The advance exhibited by this invention has high practical value as a result of simplifications realized in the manufacturing process. Only one type of coating bath needs to be made in place of two previously used, thereby reducing the number of baths for which ingredients must be stored, reducing the opportunity for errors in bath make-up and eliminating frequent changes of coating bath in coating towers, thus reducing the frequency of cleaning of the coating tower. Additionally, fewer rolls of coated film need be held in inventory for filling orders, since one type of coated film replaces two previous types. Also, the labor and expense of segregating two different types of scrap and waste film, preliminary to recovery of the coating and base materials from the scrap, is avoided.

DESCRIPTION OF THE PREFERRED EMBODIMENTS

In the coating composition defined by this invention, the preferred amounts of the minor constituents for attaining the best balance of properties such as heat-seals, barrier properties, appearance, etc., are about 3 parts by weight of behenic acid, about 0.5 part by weight of carnauba wax, about 1.5 parts by weight of candelilla wax, about 0.5 part by weight of stearamide, and about 3 parts by weight of glyceryl monostearate, per 100 parts by weight of the vinylidene chloride copolymer.

When the amount of one or more of the indicated minor constituents of the coating composition is either greater or less than the amount specified above under "Statement of the Invention", one or more of the required properties, such as release from crimped sealing jaws, adequate heat-seal strength when sealed at relatively low temperatures of about 115° to 140° C., good printability by inks, appearance, blocking performance, moisture barrier, etc., is unacceptable.

In general, the vinylidene chloride copolymers used in the present invention contain vinylidene chloride and at least one other ethylenically unsaturated monomer copolymerizable therewith. The coating composition contains a copolymer wherein the other monomer includes at least about 5 percent by weight of methacrylonitrile. Other ethylenically unsaturated monomers that can be copolymerized therewith to produce suitable coating compositions include those described in U.S. Pat. No. 3,179,532. Copolymers containing vinylidene chloride, methacrylonitrile, methyl methacrylate and itaconic acid or methacrylic acid are particularly suitable, and a preferred copolymer is vinylidene chloride/methacrylonitrile/methyl methacrylate/itaconic acid in a weight ratio 90/7/3/0.3.

It is also possible to replace up to about half of the above-described copolymer with a similar vinylidene chloride copolymer which contains less than 5 percent, e.g., 2 to 4 percent, by weight of methacrylonitrile or which contains no methacrylonitrile, while still achieving substantially the same results.

When a single vinylidene chloride copolymer is used in the composition of the invention, in order to attain acceptably low moisture permeability, the copolymer used will contain at least 88 percent by weight of vinylidene chloride. When a blend of two or more vinylidene chloride copolymers is used, one or more of them may contain less than 88 percent vinylidene chloride, so long as the weighted average vinylidene chloride content is at least 88 percent by weight.

Coatings of the compositions of the invention are made by applying a solution of the composition in a volatile organic solvent and drying. Suitable baths are made using a mixture of 65 to 70 percent by weight tetrahydrofuran and 35 to 30 percent by weight toluene. The coating bath will ordinarily contain about 18 to 22 percent by weight of solids in the bath, based on the total weight of bath.

The coating compositions of the present invention can be applied to one or both sides of a variety of base films. An especially suitable base film is regenerated cellulose. Other suitable films include polyester, such as polyethylene terephthalate, and polyolefin, such as polyethylene and polypropylene, especially such films when oriented.

EXAMPLES

In all of the examples, the same general procedure is used for preparing the coating baths and for coating the film.

Coating Bath Preparation

To 320 ml of toluene, heated to 30°–35° C., is added 300 g of the vinylidene chloride copolymer and the slurry is stirred at 30°–35° C. for 5–10 minutes. Then 945 ml of tetrahydrofuran is added, and the mixture is stirred and heated at 30°–35° C. until all of the copolymer dissolves.

Separately, a mixture of 100 ml of toluene, the desired quantities or behenic acid, carnauba wax, candelilla wax, stearamide and glyceryl monostearate, and 3 g of a finely divided particulate material such as Micro Talc or Mistron is stirred and heated to 90°–100° C. for 15–30 minutes. This portion is then added to the above portion containing the copolymer, and stirring is continued for another 15 minutes while maintaining the temperature at 32°–40° C.

Coating Procedure

With the above coating bath in a dip tank and held at 32°–40° C., the base film to be coated is passed through the dip tank, and then between a pair of doctor rolls set with a gap (generally 2 to 3 mils, or 50 to 75 microns) to meter a quantity of bath which will provide a dry coating weight of 3 to 5 g/m² total for two sides (i.e., about 1.5 to 2 g/m² per side). The film then is passed through a coating tower 6.5 ft. (2m) long, using drying air introduced at 120° C. The film speed in these examples is 90 ft./min. (27.4 m/min.), thus providing a residence time in the drying tower of 4.3 seconds.

The resulting film is evaluated for various properties.
Test Methods

Heat seal strength is measured by cutting a piece of the coated film 4 inches by 10 inches with the grain or machine direction of the film running in the long dimension of the sample into 2 pieces 4 inches by 5 inches each. The 2 pieces are superimposed so that opposite surfaces are in contact and then sealed together at each end at right angles to the grain by applying a 1 inch wide sealing bar under carefully controlled conditions of temperature (100°, 110°, or 120° C. as indicated), pressure (5 p.s.i.) and contact time one-fourth second). The sealed sheets are then cut in half at right angles to the grain. From the center of each of the two resulting pieces, two 1 inch wide strips parallel to the grain are cut. The resulting 4 sets of strips are tested by opening each set at the free end, placing them in a Suter testing machine, and pulling them apart at a rate of 20 inches per minute. The highest force in grams required to pull the strips apart is taken as a measure of the heat seal bond strength. Heat seals are measured on the coated film as is, and/or after conditioning for 16 hours at 35 percent or 81 percent relative humidity (RH), the latter test being a more severe test of the quality of the film coating.

To determine the low temperature heat seal (high speed heat seal), a Campbell wrapper is run at a rate of 100 packages per minute and the temperature of the wheels that form the fin heat seal is measured. The heat seal strength for various temperatures is determined. Ordinarily, a seal of at least 100 g./in. is desired.

Film is tested on horizontal and/or vertical make-and-fill machines to determine its jaw release properties. In general, the horizontal machines provide a more rigid test than the vertical machines. The procedure for testing is to heat the lower rotating jaw to 93° C., and vary the heat applied to the upper rotating jaw, while running at a package speed of 50 packages per minute. The crimp jaw release of the coated film is observed.

Thermal lamination of the film to itself is carried out at speeds ranging from 50 ft./min. to 450 ft./min. The conditions used range from about 96° C. at the slowest speed down to about 85° C. at the fastest speed, under a pressure of 50 psi.

Peel strength is measured by attempting to lift the coating from the base film with a sharp-edged instrument such as a knife. If the coating cannot be lifted without rupture of the coating itself, the bond is labelled "No Peel" (NP). If the coating can be lifted, a one inch wide strip of adhesive tape is attached to the loosened strip which is then pulled off at an angle of 180°. The bond so obtained can be labeled "can peel" or the actual force required to pull off the strip of coating can be recorded. For these experiments, prior to testing the coated film samples are immersed in water at 45° C. for 16 hours.

Haze is measured according to ASTM method D-1003-59T.

The blocking test is conducted by stacking sheets of the coated film under a pressure of 1½ lb./ sq. inch and placing the stack in an oven at 55° C. for 18 hours. The stored films are graded for blocking as follows: 10-no evidence of sheets sticking together; 8-sheets slightly cling together-can be separated without damage to the coating; 6-sheets stick together tightly.

Water vapor transmission rate is measured according to ASTM method E-96, Procedure E, and is expressed in grams of water transmitted per 100 square inches per 24 hours.

EXAMPLE 1

The copolymer used was a 90/7/3/0.3 vinylidene chloride/methacrylonitrile/methyl methacrylate/itaconic acid copolymer. The quantities of the five minor coating constituents are given in the Table. The base film was regenerated cellulose, 0.75 mils thick. The film properties were as follows:

Heat seal, sealed at 140° C., 1/4 sec., 5 psi:
  conditioned 72 hrs. at 35% R.H., 215 g./1.5 in.
  conditioned 72 hrs. at 81% R.H., 105 g./1.5 in.
Cold peel, conditioned 72 hrs. at 35% R.H., (no peel)
  conditioned 72 hrs. at 81% R.H., 40 g./in.
Low temperature heat seal on Campbell wrapper,
  149° C., 305 g./in.
  141° C., 253 g./in.
  132° C., 210 g./in.
Crimp jaw release on Campbell wrapper, horizontal make and fill, upper crimp jaw varied from 121° to 204° C.; no sticking throughout this range.
Appearance, haze; 3.4%
Blocking, heated at 55° C. under 1.5 psi for 24 hours; grade 9
Water vapor transmission rate, 0.50
Thermal lamination strength,
  laminated at 50 ft./min.; 211 g./in.
  laminated at 250 ft./min.; 201 g./in.
  laminated at 450 ft./min., 185 g./in.
Adhesive lamination; urethane adhesive applied from ethyl acetate or 50/50 hexane/ethyl acetate; lamination to itself, polyethylene, polypropylene or aluminum foil; all bonds acceptable.
Extrusion coating; film of this example primed with 1% alcoholic solution of polyethylenimine and extrusion coated with 0.5 mil polyethylene; bond greater than 100 g./in.
Printability, various inks; excellent.

EXAMPLES A-K

The quantities of the five minor coating constituents for these comparative examples are given in the Table. The base sheet was the same as that for Example 1. In each case, at least one of the minor constituents was outside the claimed limits, and the resulting film was unacceptable with respect to at least one property specified in the Table.

EXAMPLE 2

Example 1 was repeated, using the same quantities of the five minor constituents, but replacing half (150 g) of the indicated copolymer with a like amount of an 87/3/6/4 vinylidene chloride/methacrylonitrile/methyl methacrylate/methacrylic acid polymer. The film properties were as follows:

Heat seal, conditioned 72 hrs. at 35% R.H., 260 g./1.5 min.
  conditioned 72 hrs. at 81% R.H., 80 g./1.5 min.
Cold peel, conditioned 72 hrs. at 35% R.H., (no peel)
  conditioned 72 hrs. at 81% R.H., 50 g./in.
Low temperature heat seal on Campbell wrapper,
  141° C., 283 g./in.; 132° C., 218 g./in.; 124° C., 73 g./in.;
Crimp jaw release on Campbell wrapper, horizontal make and fill, upper crimp jaw varied as follows: 121°–191° C., no sticking; 204° C., slight sticking; 218° C., no sticking;
Appearance, haze; 3.5%
Blocking; grade 9
Water vapor transmission rate; 0.55
Printability; excellent

EXAMPLE 3

Example 1 was again repeated using the same quantities of the five minor constituents, but replacing half (150 g) of the indicated copolymer with a like amount of a 90/4/6/0.3 vinylidene chloride/acrylonitrile/methyl/methacrylate/itaconic acid polymer. The film properties were as follows:

Heat seal, conditioned 72 hrs. at 35% R.H.; 230 g./in.
  conditioned 72 hrs. at 81% R.H.; 100 g./in.
Cold peel, conditioned 72 hrs. at 35% R.H.; (no peel)
  conditioned 72 hrs. at 81% R.H.; 40 g./in.
Low temperature heat seal on Campbell wrapper,
  149° C., 245 g./in.; 141° C., 175 g./in.; 132° C., 50 g./in.
Crimp jaw release on Campbell wrapper, horizontal make and fill, upper crimp jaw varied as follows: 135°–177° C., no sticking; 191°, 204° C., slight sticking; 218° C., very slight sticking
Appearance, haze; 3.7%
Blocking; grade 9
Water vapor transmission rate, 0.61 Printability, excellent

TABLE*

| Example | Behenic Acid | Carnauba Wax | Candelilla Wax | Stearamide | Glyceryl Monostearate | Deficiencies** |
|---|---|---|---|---|---|---|
| 1 | 3 | 0.5 | 1.5 | 0.5 | 3 | |
| A | 3 | 0.5 | 1.5 | 0.75 | 0.75 | a |
| B | 4 | 0.5 | 1.5 | 0.5 | 3 | b |
| C | 2 | 0.5 | 1 | 0.5 | 3 | c |
| D | 1 | 0.5 | 1.5 | 0.5 | 3 | c |
| E | 2 | 0 | 1.5 | 0.5 | 3 | c |
| F | 0 | 0.5 | 1.5 | 0.5 | 3 | b |
| G | 2 | 0.5 | 0 | 0.5 | 3 | b |
| H | 2 | 0.5 | 1 | 0.5 | 0 | c |
| J | 2 | 0.5 | 1 | 0 | 3 | c |
| K | 2 | 0.5 | 1 | 0.5 | 3 | b |

*Amounts of minor constitutents are in grams.
**Deficiencies: a = printing characteristics unacceptable
b = low temperature heat seal inadequate
c = sticking to crimped heat-sealing bars

I claim:

1. A heat-sealable coating composition comprising a copolymer of vinylidene chloride, at least one other ethylenically unsaturated monomer copolymerizable therewith, and at least 5 weight percent of methacrylonitrile, the copolymer containing at least about 88 weight percent vinylidene chloride, and, per 100 parts by weight of the total copolymer, 2.7 to 3.3 parts by weight of behenic acid, 0.4 to 0.6 part by weight of carnauba wax, 1.2 to 1.8 parts by weight of candelilla wax, 0.5 to 1.0 part by weight of stearamide, and 2.7 to 3.3 parts by weight of glyceryl monostearate.

2. The coating composition of claim 1 wherein there are 3 parts by weight of behenic acid, 0.5 part by weight of carnauba wax, 1.5 parts by weight of candelilla wax, 0.5 part by weight of stearamide, and 3 parts by weight of glyceryl monostearate.

3. The coating composition of claim 1 wherein said copolymer contains vinylidene chloride, methacrylonitrile, methyl methacrylate and itaconic acid units in a 90/7/3/0.3 weight ratio.

4. A liquid composition comprising the coating composition of claim 1 in a volatile organic solvent.

5. The liquid composition of claim 4 wherein the solvent consists of 65 to 70 percent by weight of solvent of tetrahydrofuran and complementally 35 to 30 percent by weight of solvent of toluene, and the solids constitute 18 to 22 percent by weight of the liquid composition.

6. The coating composition of claim 1 comprising the copolymer of vinylidene chloride, at least one other ethylenically unsaturated monomer copolymerizable therewith, and at least 5 weight percent of methacrylonitrile, the copolymer containing at least about 88 weight percent vinylidene chloride, and another copolymer of vinylidene chloride, at least one other ethylenically unsaturated monomer copolymerizable therewith, and 0 to less than 5 weight percent of methacrylonitrile, the total vinylidene chloride content on a weighted average basis being at least about 88 percent of the total copolymer, and, per 100 parts by weight of the total copolymer, 2.7 to 3.3 parts by weight of behenic acid, 0.4 to 0.6 part by weight of carnauba wax, 1.2 to 1.8 parts by weight of candelilla wax, 0.5 to 1.0 part by weight of stearamide, and 2.7 to 3.3 parts by weight of gylceryl monostearate.

7. The coating composition of claim 6 wherein there are 3 parts by weight of behenic acid, 0.5 part by weight of carnauba wax, 1.5 parts by weight of candelilla wax, 0.5 part by weight of stearamide, and 3 parts by weight of glyceryl monostearate.

8. A liquid composition comprising the coating composition of claim 6 in a volatile organic solvent.

9. The liquid composition of claim 8 wherein the solvent consists of 65 to 70 percent by weight of solvent of tetrahydrofuran and complementally 35 to 30 percent by weight of solvent of toluene, and the solids constitute 18 to 22 percent by weight of the liquid composition.

* * * * *